L. H. BROCKEST.
TAPER PIPE.
APPLICATION FILED MAR. 25, 1918.

1,301,096.

Patented Apr. 22, 1919.

INVENTOR
L. H. Brockest
By
ATTYS

UNITED STATES PATENT OFFICE.

LORNE HENRY BROCKEST, OF WINNIPEG, MANITOBA, CANADA.

TAPER PIPE.

1,301,096.  Specification of Letters Patent.  Patented Apr. 22, 1919.

Application filed March 25, 1918. Serial No. 224,585.

*To all whom it may concern:*

Be it known that I, LORNE HENRY BROCKEST, of the city of Winnipeg, in the Province of Manitoba, Canada, have invented certain new and useful Improvements in Taper Pipes, of which the following is the specification.

The invention relates to improvements in taper pipes, especially taper stove pipes, and the principal object of the invention is to provide a taper pipe, the small end of which can be adjusted to accommodate varying sizes of stove collars.

A further object is to construct a taper pipe such that when the small end thereof is fitted on the collar it will make a tight joint and will be held fast to the collar.

A still further object of the invention is to construct the taper pipe so that the lengthwise joint in the pipe will be always effectively closed in all positions of adjustment.

With the above objects in view the invention consists essentially in the arrangement and construction of parts hereinafter more particularly described and later pointed out in the appended claims, reference being had to the accompanying drawing in which:—

Figure 1:
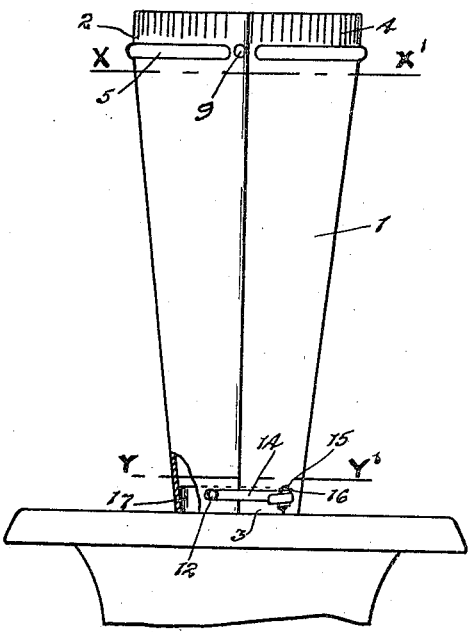
Figure 1 represents a side view of my taper pipe as it appears applied on the stove collar.
Figure 3:
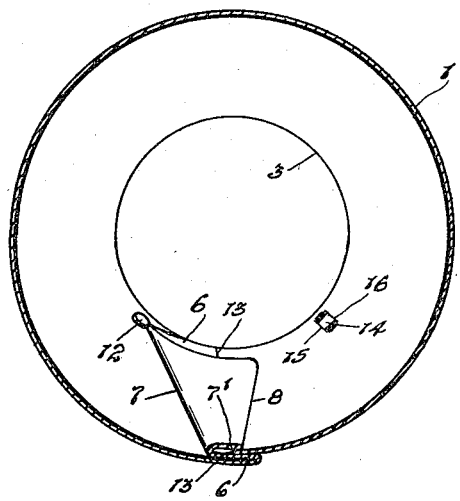

Fig. 3 represents an enlarged detailed horizontal sectional view through the pipe, the section being taken in the plane denoted by the line X—X' Fig. 1.

Figure 4:
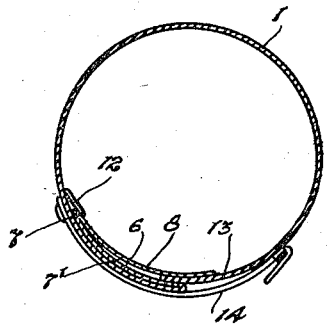

Fig. 4 represents an enlarged detailed horizontal sectional view through the pipe, the section being taken in the plane denoted by the line Y—Y' Fig. 1.

In the drawing like characters of reference indicate corresponding parts in the several figures.

I might here explain that at the present time considerable difficulty is experienced in fitting taper pipes owing to the fact that the pipe collars of the various styles of stoves manufactured vary, with the result that there is a considerable fluctuation in the exterior diameter of the collars. Consequently, where tapering pipes are made with no adjustment provided, one in ordering may very easily obtain a pipe which will not fit his particular stove collar properly, with the result that there is a bad joint made and the pipe is useless or has to be returned and a new one procured.

Further this practice requires the stores to carry a considerable range of taper pipes to meet the demand and even when this is done the result is not satisfactory and misfits occur.

With my arrangement it is only necessary to keep in stock say three sizes of taper pipes which cover the whole range of stove collars and there is no possibility of a misfit as the particular taper pipe bought can be adjusted to fit properly the stove collar.

In this connection it is mentioned that stove pipes run in sizes and as the large end of the taper pipe has to fit the stove pipe the salesman, knowing the size of the stove pipe, can give the buyer a proper sized adjustable taper pipe, the large end of which will fit the stove pipe and the small end of which he is assured can be adjusted to fit the collar.

Figure 2:
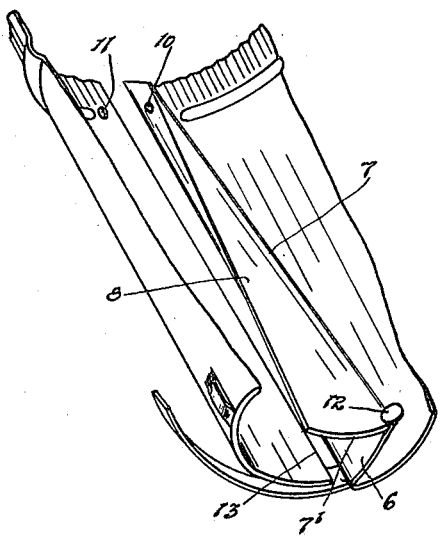
Fig. 2 represents a perspective view of a fragmentary portion of the pipe looking at it from the interior.

Referring now to the drawing, 1 represents my taper pipe which is formed, as is customary, from a single piece of sheet metal cut so that when shaped into the tapering pipe form, presents a large end 2 and a small end 3, the large end being crimped at 4 as is customary and fitted with a rib 5. One of the meeting edges of the pipe is lapped backwardly and inwardly on itself as indicated at 6 and then is bent again at 7 to provide an inner V-shaped flap 8. The upper end of the pipe is held closed by a rivet 9 which forms a pivot joint and here it is to be noticed (see Fig. 2) that two holes 10 and 11 are formed in the edges of the pipe to receive the rivet, the hole 10 being made so that it passes through both the body of the pipe and the back turned part 6 thereof.

Further it is to be observed that the back-turned part 6 increases gradually in width in passing from the top to the bottom of the pipe and that the flap 8 is wider at the lower end and disappears immediately to the side of the rivet at the upper end. The flap and the back-turned portion 6 are fastened securely to the pipe at the lower end by a rivet 12 passed through the pipe and the head of which, in the present instance, laps over both the flap and the back-turned part 6.

The other of the meeting edges of the pipe is retained in its natural form and is adapted to pass into the tapering channel 7' formed between the flap and the back-turned portion 6. In describing this channel as a tapering one I mean that it increases in depth in passing from the top of the pipe to the bottom, being practically no depth at the top adjoining the rivet 9 and full depth at the bottom adjoining the rivet 12.

The greatest depth of this channel determines the amount of adjustment which can be given the taper pipe as it will be obvious that when the lower end of the pipe is squeezed in fully the edge 13 thereof takes a position at the base of the channel which is limited by the bend 7.

I wish it here to be particularly noticed that at all times, regardless of the adjustment given, the edge 13 of the pipe is contained within the channel so that a lapped joint is always maintained.

In order to facilitate in drawing up or adjusting the small end of the pipe I have provided a metallic pulling strap 14, which has the one end permanently attached to the pipe by the rivet 12 and the other end passed slidably through two cross slits 15 and 16 cut in the lower end of the pipe, the arrangement being such that when the free end of the strap is pulled the lower end of the pipe is contracted.

The manner is which this taper pipe is used is now described, reference being had particularly to Figs. 1 and 3, where a stove collar is indicated at 17.

To apply the pipe one loosens the strap and opens up the lower end of the pipe to allow it to pass over the collar. He then catches the free end of the strap and pulls it through the slits until the small end of the pipe is closed tightly around the collar. When this is done he then bends the free end of the strap backwardly on itself as shown in Fig. 1 to prevent the strap from loosening. This completes the fastening and a tight joint is effected.

What I claim as my invention is:—

1. As a new article of manufacture, a taper pipe provided with a lengthwise extending slit and having the two edges of the slit brought together and pivotally connected at the large end of the pipe and one edge of the pipe at the slit formed to present a lengthwise extending channel gradually increasing in depth from a point adjacent the pivot to the opposite end of the pipe and with the channel receiving slidably the opposite edge of the pipe.

2. As a new article of manufacture, a taper pipe provided with a lengthwise extending slit and having the two edges of the slit brought together and pivotally connected at the large end of the pipe and one edge of the pipe at the slit formed to present a lengthwise extending channel gradually increasing in depth from a point adjacent the pivot to the opposite end of the pipe and with the channel receiving slidably the opposite edge of the pipe and means for contracting the small end of the pipe and fastening it in the contracted position.

3. As a new article of manufacture, a taper pipe provided with a lengthwise extending slit and having one edge of the pipe at the slit lapped backwardly on itself and then forwardly to form a lengthwise extending tapering channel with the greatest depth of the channel at the small end of the pipe and with the channel adapted to receive slidably the other edge of the pipe.

4. As a new article of manufacture, a taper pipe provided with a lengthwise extending slit and having one edge of the pipe at the slit lapped backwardly on itself and then forwardly to form a lengthwise extending tapering channel with the greatest depth of the channel at the small end of the pipe and with the channel adapted to receive slidably the other edge of the pipe and means applied on the small end of the pipe for contracting and locking the same in the contracted position.

5. As a new article of manufacture, a taper pipe provided with a lengthwise extending slit and having one edge of the pipe at the slit lapped backwardly on itself and then forwardly to form a lengthwise extending tapering channel with the greatest depth of the channel at the small end of the pipe and with the channel adapted to receive slidably the other edge of the pipe and a fastening strap adjustably connected to the opposite edges of the pipe at the small end thereof.

Signed at Winnipeg, this 28 day of February 1918.

LORNE HENRY BROCKEST.

In the presence of—
 GAROLD S. ROXBURGH,
 K. B. WAKEFIELD.